United States Patent [19]

Toba

[11] 4,266,269

[45] May 5, 1981

[54] FLY-BACK TRANSFORMER

[75] Inventor: Akira Toba, Fukaya, Japan

[73] Assignee: Tokyo Shibaura Denki Kabushiki Kaisha, Kawasaki, Japan

[21] Appl. No.: 21,548

[22] Filed: Mar. 15, 1979

[30] Foreign Application Priority Data

Mar. 23, 1978 [JP] Japan ........ 53-32321

Mar. 23, 1978 [JP] Japan ........ 53-32322

[51] Int. Cl.[3] ........ H02M 7/10

[52] U.S. Cl. ........ 363/68; 363/53; 336/185; 336/198; 358/190; 315/411

[58] Field of Search ........ 363/53, 61, 67, 68; 336/69, 70, 182, 185, 198, 208; 315/411; 358/190

[56] References Cited

U.S. PATENT DOCUMENTS

| | | | |
|---|---|---|---|
| 3,381,204 | 4/1968 | Cox | 363/61 |
| 3,886,434 | 5/1975 | Schreiner | 363/68 |
| 3,904,928 | 9/1975 | Sawada et al. | 336/185 X |
| 3,936,719 | 2/1976 | Miyoshi et al. | 363/68 X |
| 4,091,349 | 5/1978 | Niederjohn et al. | 363/68 X |

FOREIGN PATENT DOCUMENTS 51-62327 5/1976 Japan .

*Primary Examiner*—William M. Shoop

*Assistant Examiner*—Peter S. Wong

*Attorney, Agent, or Firm*—Cushman, Darby & Cushman

[57] ABSTRACT

A multilayer-winding fly-back transformer is provided with first, second, third, fourth, fifth and outermost cylindrical bobbins made of dielectric material and arranged concentrically. A magnetic core is inserted in the first or innermost bobbin, and a primary winding is wound in layers on the outer periphery of this bobbin. The first, second, third and fourth secondary windings are wound in layers round the second, third, fourth and fifth bobbins, respectively. First, second, third and fourth diodes are connected between the first and second secondary windings, the second and third secondary windings, the third and fourth secondary windings, and between the fourth secondary winding and an output terminal, respectively. A capacitor is formed between the cathode of the fourth diode and the anode of the third diode.

10 Claims, 10 Drawing Figures

FLY-BACK TRANSFORMER

This invention relates to a high voltage rectifier, more specifically to an improvement in the so-called multilayer winding fly-back transformer disclosed in U.S. Pat. No. 3,381,204.

A fly-back transformer is generally known as a device which is used with a high voltage generating circuit, such as TV receivers and oscilloscopes. In one such fly-back transformer, there is a tuning fly-back transformer formed of a primary winding and a number of secondary windings. These secondary windings are wound on the same bobbin, each two adjacent secondary windings being connected in series through a diode. In such a tuning fly-back transformer, when a horizontal output pulse or fly-back pulse is applied as an input pulse to the primary winding, an odd-order higher harmonic wave of a fundamental wave applied to the primary winding, such as for example the third higher harmonic wave, is tuned and produced at the secondary windings because the distributed capacity among the secondary windings is sufficiently small so that a high voltage is produced at the output side of the secondary windings. Although this tuning fly-back transformer can efficiently produce high voltages ranging from 7 to 28 kV, the high-voltage regulation is poor. If the high-voltage regulation is poor, the reproduced picture of a TV receiver, for example, may suffer deterioration.

Multlayer-winding fly-back transformers have been designed to eliminate the aforesaid defects or provide stable high-voltage regulation. The multilayer-winding fly-back transformer described in U.S. Pat. No. 3,381,204 or U.K. Pat. No. 1,090,995 corresponding thereto, comprises a number of cylindrical bobbins made of dielectric material and arranged concentrically, a magnetic core inserted in the innermost one of the bobbins, a primary winding wound on the outer periphery of the innermost bobbin, a number of secondary windings wound in layers in the same direction between the remaining bobbins, and a number of diodes arranged over the outermost bobbin, each connected between adjacent secondary windings in layer, and connecting the secondary windings in series. Since, in such multilayer-winding fly-back transformers, the secondary windings are arranged nearer to one another as compared with those of the tuning fly-back transformer, stray capacitance between adjacent windings is significantly larger than between adjacent windings in the tuning fly-back transformer. Therefore, although the multilayer-winding fly-back transformer is incapable of providing high voltages as efficiently as the tuning fly-back transformer, it does provide superior high voltage regulation. As a consequence, the multilayer winding fly-back transformer is considered to be more suitable for TV receiver, oscilloscope and other high voltage generating circuit applications than the tuning fly-back transformer.

Although this multilayer-winding fly-back transformer is useful in TV receivers and other high voltage generating circuits, it has a drawback. Specifically if a short circuit occurs on the output side of the secondary windings or if discharge is caused within a picture tube, the diodes will be subjected to a high reverse voltage, and one or some of them will possibly be destroyed. Such defect may be eliminated by using diodes which can withstand a sufficiently high reverse voltage, though such a multilayer-winding fly-back transformer still involves a problem—high cost attributable to the required high performance diodes.

The object of this invention is to provide a multilayer-winding fly-back transformer capable of consecutively using diodes without involving any breakdown thereof even in case of a short circuit between the output terminals of secondary windings.

According to an embodiment of the invention, there is provided a fly-back transformer comprising a number of cylindrical bobbins made of dielectric material and arranged concentrically, a magnetic core inserted in the innermost one of the bobbins, a primary winding wound in a layer on the outer periphery of the innermost bobbin, a pair of input terminals connected to the primary winding, a number of secondary windings wound in a layer in the same winding direction on the corresponding bobbins to be arranged between the remaining bobbins, a pair of output terminals connected respectively to the innermost and outermost ones of the secondary windings, a number of diodes each having a cathode and an anode and arranged over the outermost bobbin one of the diodes being connected between the outermost secondary winding and one of the output terminals, the other diodes each of which is connected between each of the adjacent secondary windings in the forward direction thereby connecting the number of secondary windings in series between the pair of output terminals, and a capacitor formed between the cathode of said one diode connected to one end of the outermost secondary winding and the cathode of one of said other diodes whose anode is connected to the other end of the outermost secondary winding.

According to another embodiment of the invention, there is provided a fly-back transformer comprising a number of cylindrical bobbins made of dielectric material and arranged concentrically, a magnetic core inserted in the innermost one of the bobbins, a primary winding wound in layer on the outer periphery of the innermost bobbin, a pair of input terminals connected to the primary winding, a number of secondary windings wound in a layer in the same winding direction on the corresponding bobbins to be arranged between the remaining bobbins, a pair of output terminals connected respectively to the innermost and outermost ones of the secondary windings, and a number of diodes each having a cathode and an anode and arranged over the outermost bobbin, one of the diodes being connected between the outermost secondary winding and one of the output terminals, the other diodes each of which is connected between each of the adjacent secondary windings in the forward direction thereby connecting the number of secondary windings in series between the pair of output terminals, one of said diodes which is connected between the outermost secondary winding and a secondary winding adjacent to and inside the outermost secondary winding having a higher reverse withstanding voltage as compared with the others.

According to still another embodiment of the invention, there is provided a fly-back transformer comprising a number of cylindrical bobbins made of dielectric material and arranged concentrically, a magnetic core inserted in the innermost one of the bobbins, a primary winding wound in a layer on the outer periphery of the innermost bobbin, a pair of input terminals connected to the primary winding, a number of secondary windings wound in a layer in the same winding direction on the corresponding bobbins to be arranged between the remaining bobbins, a pair of output terminals connected respectively to the innermost and outermost ones of the secondary windings, and a number of diodes each having a cathode and an anode and arranged over the outermost bobbin, one of the diodes being connected between the outermost secondary winding and one of the output terminals, the other diodes each of which is connected between each of the adjacent secondary windings in the forward direction thereby connecting the number of secondary windings in series between the pair of output terminals; wherein inter-layer capacitors are formed between adjacent ones of the secondary windings, the inter-layer capacitors consisting of anode-side interlayer capacitors measured from between one end of the adjacent secondary windings connected to the anodes of the diodes and cathode-side inter-layer capacitors measured from between the other ends of the adjacent secondary windings connected to the cathodes of the diodes or one of the output terminals to be earthed, the capacitance of each anode-side inter-layer capacitor being lower than that of each cathode-side inter-layer capacitor.

This invention can be more fully understood from the following detailed description when taken in conjunction with the accompanying drawings, in which.

Figure 5:
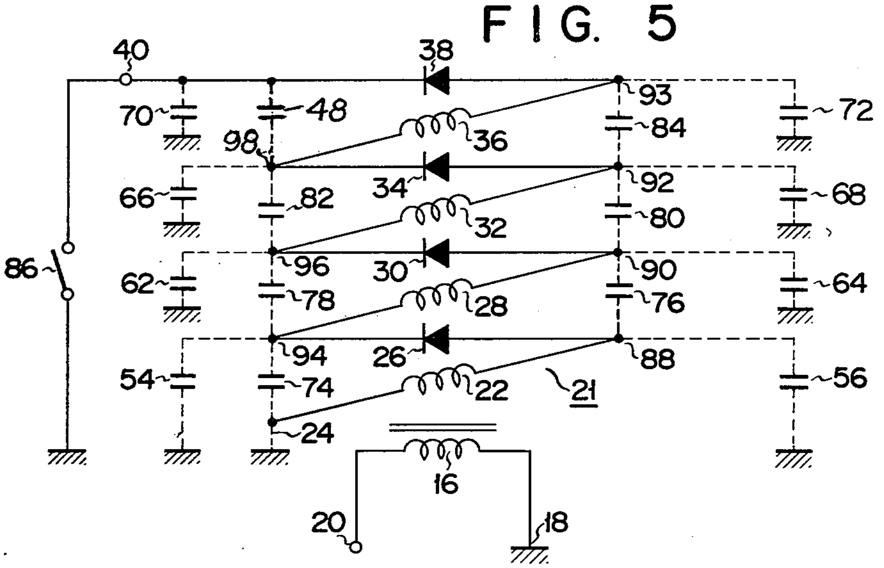
FIG. 5 is an equivalent circuit diagram of the multilayer-winding fly-back transformer as shown in the circuit diagram of FIG. 2, with additional illustration of the stray capacitors and inter-layer capacitors.
Figure 7:
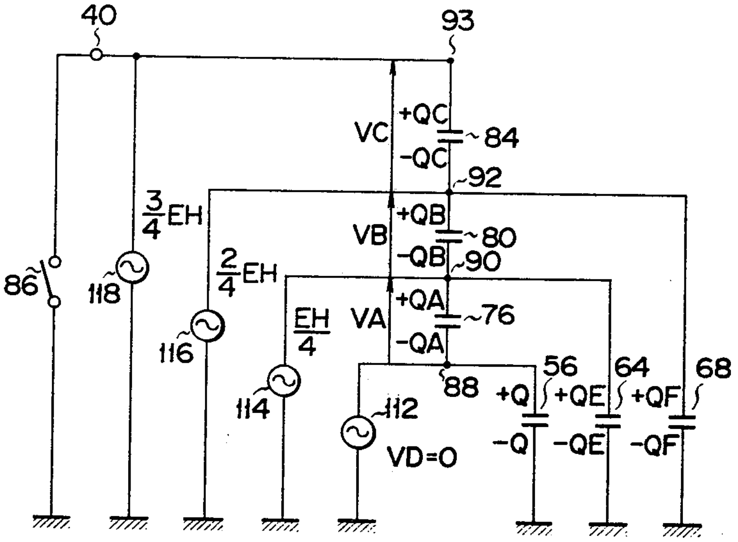
Figure 8:
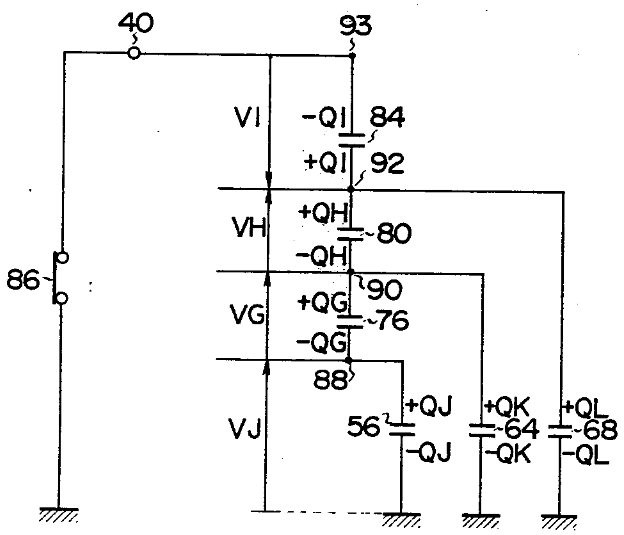
Figure 9:
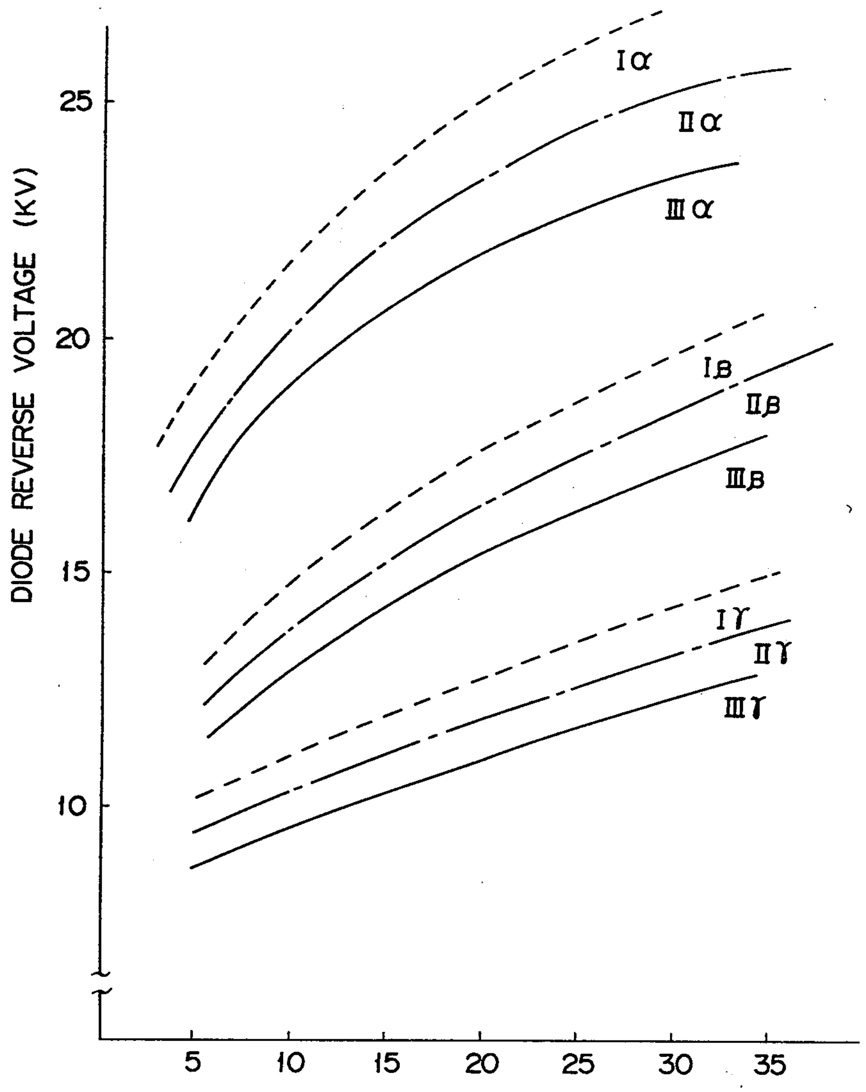
Figure 10:
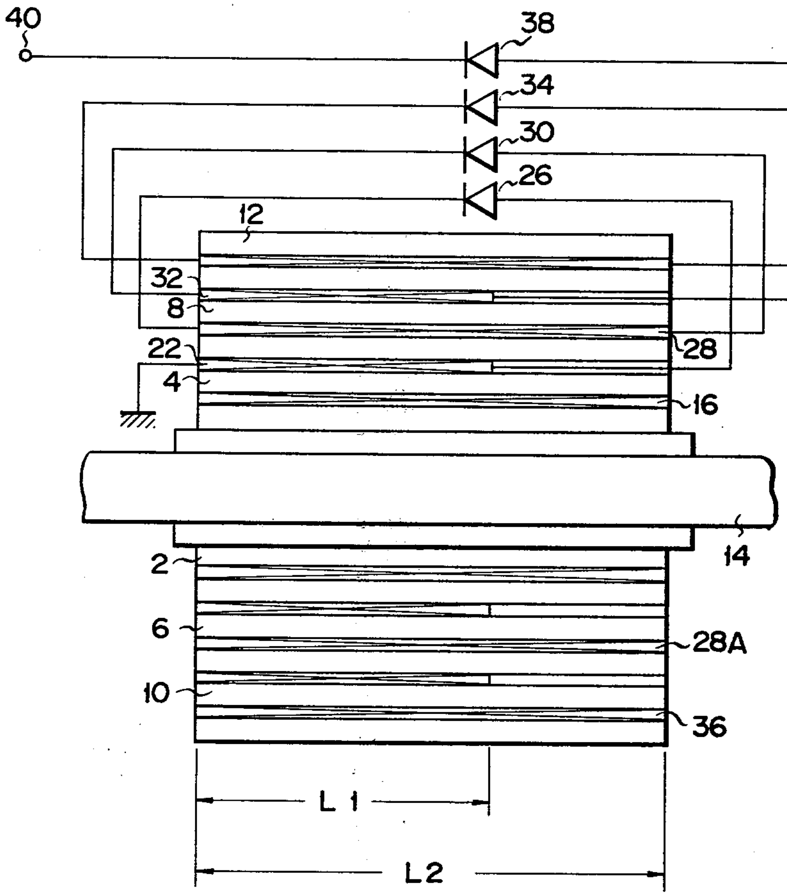

FIGS. 7 and 8 each are part of the equivalent circuit diagram of FIG. 5 for analysis of the breakdown process of the diodes;

FIG. 9 illustrates the relationship between the capacitance of each anode-side inter-layer capacitor between each two adjacent secondary winding and the reverse voltage applied to each diode; and FIG. 10 is a sectional view showing an outline of an embodiment of the multilayer fly-back transformer of the invention.

Now there will be described embodiments of the multilayer-winding fly-back transformer of this invention with reference to the accompanying drawings.

Figure 1:
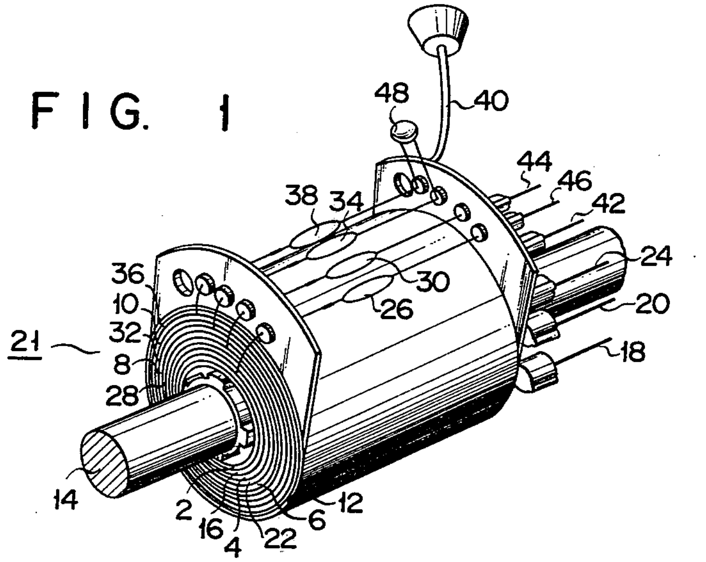
FIG. 1 is a perspective view showing an outline of a multilayer-winding fly-back transformer according to this invention.

Referring now to the drawing of FIG. 1, there is shown a multilayer-winding fly-back transformer according to an embodiment of the invention which comprises a number of cylindrical bobbins made of dielectric material, six bobbins 2, 4, 6, 8, 10 and 12 as illustrated, a primary winding 16 and a main secondary winding 21 which includes a plurality of secondary windings, for example four secondary windings 22, 28, 32, 36. These bobbins are arranged concentrically, and a magnetic core 14 is inserted in the first bobbin 2 located in the innermost position. The magnetic core 14 is coupled to a magnetic member outside of the first bobbin 2 to form a magnetic circuit (not shown). A primary winding 16 is wound closely on the outer peripheral surface of the first bobbin 2 in a layer form. Input terminals 18 and 20 are connected to opposite ends of the primary winding 16 respectively. On the outer periphery of the primary winding 16 is the second bobbin 4, the outer peripheral surface of the second bobbin 4 on which a first secondary winding 22 is wound closely in a layer form. One end of the first secondary winding 22 is connected to an output terminal 24 to be grounded, while the other end is connected to the anode of a first diode 26 arranged over the outmost bobbin 12. On the outer peripheral surface of the third bobbin 6 on the outer periphery of the first secondary winding 22 is a second secondary winding 28 closely wound in a layer form in the same direction with the first secondary winding 22 with one end thereof connected to the cathode of the first diode 26. The other end of the second secondary winding 28 is connected to the anode of a second diode 30 disposed, like the first diode 26, over the outermost bobbin 12. Further, on the outer peripheral surface of the fourth bobbin 8 on the outer periphery of the second secondary winding 28 is a third secondary winding 32 closely wound in a layer form in the same direction with the first and second secondary windings 22 and 28 with one end thereof connected to the cathode of the second diode 30. The other end of the third secondary winding 32 is connected to the anode of a third diode 34 disposed, like the first and second diodes 26 and 30, over the outermost bobbin 12. Also, on the outer peripheral surface of the fifth bobbin 10 on the outer periphery of the third secondary winding 32 is a fourth secondary winding 36 wound closely in a layer form in the same direction with the first, second and third secondary windings 22, 28 and 32 with one end thereof connected to the cathode of the third diode 34. The outermost bobbin 12 is disposed on the outer periphery of the fourth secondary winding 36, the other end of which is connected to the anode of a fourth diode 38 arranged over the bobbin 12. The cathode of the fourth diode 38 is connected to an output terminal 40 which is to be connected to the anode of a picture tube. Another terminal 42, which is connected to any one of the diode cathode providing a DC voltage of several kilovolts to be coupled to the focus electrode of the picture tube. Further terminals 44 and 46, which are connected to a tertiary winding wound independently of the primary winding 16, are adapted to detect voltage applied to the primary winding 16.

In this embodiment of the multilayer-winding transformer of the invention, as shown in FIG. 1, a capacitor 48 with capacitance of approximately 15 pF is connected in parallel with a series circuit of the fourth secondary winding 36 and fourth diode 38, that is, between one end of the fourth secondary winding 36 and the output terminal 40. By this connection of the capacitor 48, any high reverse voltage may be prevented from being suddenly applied to the diodes 26, 30, 34 and 38. These circumstances will now be made clear by explaining the principle of the multilayer-winding fly-back transformer and the causes of breakdown of the diodes.

Figure 2:
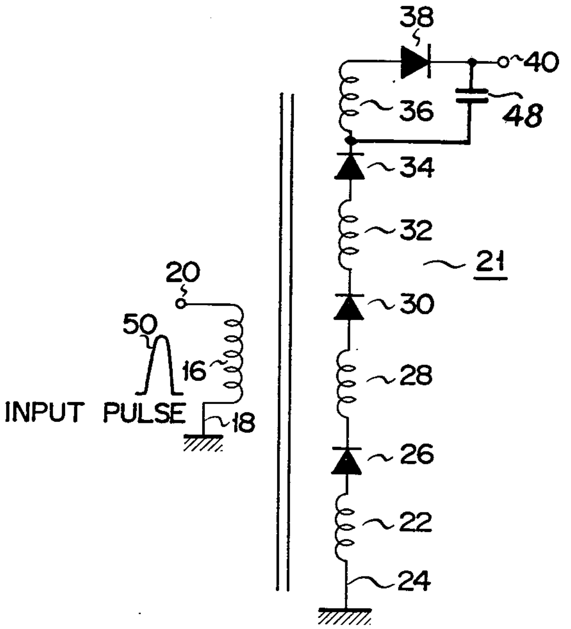
FIG. 2 is a circuit diagram of the multilayer-winding fly-back transformer.

The multilayer-winding fly-back transformer of FIG. 1 may be described as shown in the circuit diagram of FIG. 2. As shown in this drawing, the multilayer-winding fly-back transformer comprises the main secondary winding 21 which is divided by the diodes 26, 30, 34 and 38 to provide the secondary windings 22, 28, 32 and 36. The secondary windings 22, 28, 32 and 36 are connected in series with one another via the diodes 26, 30, 34 and 38. Each of the secondary windings substantially independently functions as a transformer.

Figure 3:
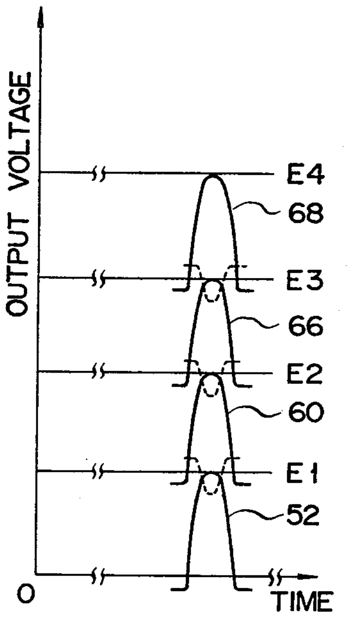
FIG. 3 shows waveforms of output pulses produced at secondary windings as shown in FIG. 2 and potentials at the cathodes of diodes.
Figure 4:
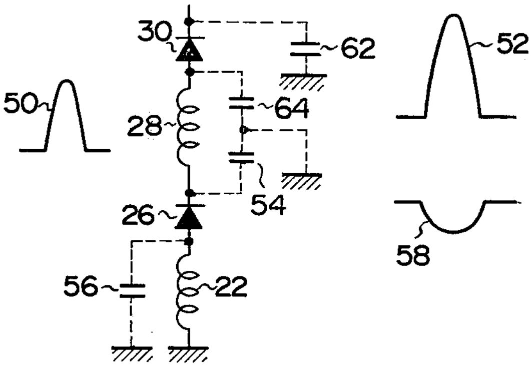
FIG. 4 is part of the circuit diagram of FIG. 2 showing stray capacitors.

When a fly-back pulse or horizontal output pulse as an input pulse 50 is applied to the primary winding 16, an output pulse 52 is produced at the first secondary winding 22, as shown in FIG. 3. The output pulse 52, as shown in FIG. 4, is smoothed by the first diode 26 and a stray capacitor 54 between the cathode of the first diode 26 and the earth, and a DC potential at a level of E1 appears at the cathode of the first diode 26. It may be added that a stray capacitor 56 is formed between the anode of the first diode 26 and the earth and a DC potential on the anode of the diode 26 becomes substantially zero. Also, when the input pulse 50 is applied to the primary winding 16, an output pulse 60 is produced at the second secondary winding 26, as shown in FIG. 3. The output pulse 60 is superposed on the DC potential E1 and smoothed by the second diode 30 and a stray capacitor 62 between the cathode of the second diode 30 and the earth. As a result, a DC potential at a level of E2 appears at the cathode of the second diode 30. The stray capacitor 54 causes a reverse output pulse 58, and the DC potential at the anode of the second diode 30 becomes substantially E1. The reverse output pulse 58, being a voltage reversely applied to the first diode 26, has no influence on the potential E1 which appears at the cathode of the second diode 30. Also, between the anode of the second diode 30 and the earth is a stray capacitor 64. Likewise, output pulses 66 and 68 corresponding to the input pulse 50 are produced, respectively, at the third and fourth secondary windings 32 and 36, and DC potentials of E3 and E4 appear at the diodes 34 and 38, respectively. Consequently, a high DC potential $E4(=E_H)$ appears at the output terminal 40 of the secondary windings. If the DC voltages produced at the secondary windings 22, 28, 32 and 36 are equal, then they will be $E_H/4$. Such DC voltages at $E_H/4$ are superposed at those four secondary windings 22, 28, 32 and 36, whereby a high DC potential $E_H$ appears at the output terminal 40.

While the principle of boosting of the multilayer-winding fly-back transformer may be clear from the above description, it is to be noticed that, in the multilayer-winding fly-back transformer, a relatively large interlayer capacity is formed between each adjacent two of the secondary windings 22, 28, 32 and 36. FIG. 5 shows an equivalent circuit including such inter-layer capacities. In FIG. 5, like reference numerals refer to the same parts as shown in FIGS. 1 and 2. Numerals 66 and 70 designate, respectively, stray capacitors between the respective cathodes of the third and fourth diodes 34 and 38 and the earth, while numerals 68 and 72 denote stray capacitors between the respective anodes of the third and fourth diodes 34 and 38 and the earth, respectively. Further, a cathode-side inter-layer capacitor 74 and an anode-side inter-layer capacitor 76 are formed between the first and second secondary windings 22 and 28, and a cathode-side inter-layer capacitor 78 and an anode-side inter-layer capacitor 80 are formed between the second and third secondary windings 28 and 32. Also, cathode- and anode-side inter-layer capacitors 82 and 84 are formed between the third and fourth secondary windings 32 and 36. These inter-layer capacitors are distributed along the arrangement of the secondary windings. The cathode-side inter-layer capacitor is one viewed from one end of each pair of secondary windings connected to the cathode of each diode or the earth. On the other hand, the anode-side inter-layer capacitor is one viewed from the other end of each pair of secondary windings connected to the anode of each diode. Although the output terminal 40 is connected to the anode of the picture tube, a switch 86, in place of the picture tube, is connected to the output terminal 40 for the ease of explanation. This is done because the one or some diodes is broken down if the picture tube suffers tube discharge, or if the output terminal 40 is shorted. Namely, FIGS. 5 and 2 are an equivalent circuit diagram and a circuit diagram of a prior art multilayer-winding fly-back transformer, respectively.

The inventor hereof paid special attention to the following point in the equivalent circuit of FIG. 5. That is, he noticed that no inter-layer capacity is formed between the respective cathodes of the third and fourth diodes 34 and 38. While the input pulse is supplied to the primary winding 16 and high voltage continues to be supplied to the output terminal 40 of the secondary windings, with the switch 86 open, the stray capacitors 54, 56, 62, 64, 66, 68, 70 and 72 and the inter-layer capacitors 74, 76, 78, 80, 82 and 84 are charged with predetermined voltages. When the switch 86 is closed, that is, when discharge occurs in the picture tube for some reason, however, the electric charges on these capacitors start to be discharged. In the process of such discharge, the electric charges on the stray capacitors 56, 64, 68 and 72 and the inter-layer capacitors 76, 80 and 84 are quickly discharged through the diode 38. As a result, potentials at nodes 88, 90 and 92 respectively between the anodes of the diodes 26, 30 and 34 and the other ends of the secondary windings 22, 28 and 32 drop gradually. On the other hand, the electric charges on the stray capacitors 54, 62 and 66 and the inter-layer capacitor 74, 78 and 82 are discharged through the fourth secondary winding 36 and the diode 38, so that the discharge is done relatively slowly. In consequence, potentials at nodes 94, 96 and 98 respectively between the cathodes of the diodes 26, 30 and 34 and the one ends of the secondary windings 28, 32 and 36 never drop gradually. Since the interlayer capacitors 74, 79 and 82 are formed in series, the potential at the node 98 is the highest, followed by the potential at the node 96. Accordingly, the highest high reverse voltage is applied to the diode 34, a lower high reverse voltage is applied to the diode 34, and then a further lower one is applied to the diode 26.

As may be evident from the above description, the diodes will be broken by the difference between the discharge path for the capacitors on the anode and cathode sides of the diodes, that is, the difference between the D.C. potential of the anode and cathode sides of the diodes. In this embodiment of the invention, therefore, the capacitor 48 is connected between the diodes 34 and 38, as shown in FIG. 1, to form an additional discharge path on the cathode side of the diodes. By connecting the capacitor 48 between the cathodes of the diodes 34 and 38, the charges on the cathode-side capacitors 54, 62, 66, 74, 78 and 82 may be as quickly discharged as those on the anode-side capacitors 56, 64, 68, 72, 76, 80 and 84. Thus, the diodes 34, 30 and 26 will not be supplied with so high reverse voltages, avoiding the breakdown.

Measured values of the capacitances of those capacitors, for example, are as follows; 55 pF for the stray capacitor 54, 36 L pF for the capacitor 62, 32 pF for the capacitor 66, 34 pF for the capacitor 56, 6 pF for the capacitor 64, 8 pF for the capacitor 68, and 9 pF for the capacitor 72. The stray capacitor 70 has its capacitance value determined when it is connected to the picture tube. The capacitance values of the interlayer capacitors 74, 76, 78, 80, 82 and 84 are substantially equal to 15 pF. The inductance and resistance of the secondary winding are 200 mH and 1 kΩ respectively. Taking account of these figures, the capacitance of the capacitor 48 may suitably be set at 15 pF equal to that of each inter-layer capacitor.

Figure 6:
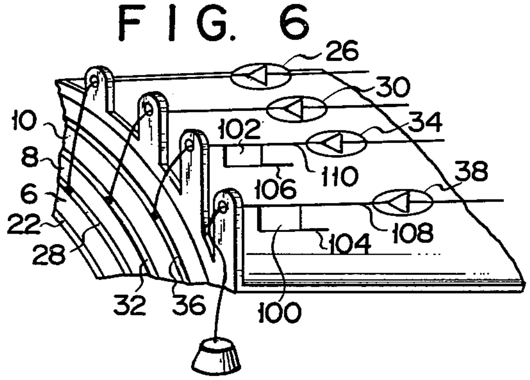
FIG. 6 is a partial perspective view showing an embodiment of the multilayer-winding fly-back transformer of the invention.

No capacitor element is absolutely required for the capacitor 48; conductive metal plates 100 and 102, as shown in FIG. 6 illustrating a modification, may be formed on the outermost bobbin 12 instead of using such capacitor element. The metal plates 100 and 102 are fixed in grooves 104 and 106 formed in the surface of the outermost bobbin 12, and are connected to lead wires 108 and 110 whose edge surfaces are connected to the fourth and third diodes 38 and 34, respectively. As a result, a capacitor is formed between the metal plates 100 and 102. The capacitance of such capacitor need only be as high as the capacitance of the inter-layer capacitor. This embodiment, employing such pair of metal plates 100 and 102, has the advantage of reduced cost as compared with the case where the capacitor element as shown in FIG. 1 is used.

According to another embodiment of the multilayer-winding fly-back transformer, the third diode 34 has a higher reverse withstanding voltage. It is so because the highest reverse voltage will be applied to the diode connected second from the highest voltage side, that is, the one connected between the outermost secondary winding and a secondary winding adjacent thereto, as may be understood from the previous description of the cause of diode breakdown and the result of a theoretical analysis of a case where reverse voltages are applied to the diodes, as mentioned later. Hereupon, the reverse withstanding voltages of the diodes are selected at values higher than values $V_\alpha$, $V_\beta$ and $V_\gamma$ that comply with the result of the theoretical analysis. As for the reverse withstanding voltage of the second diode 30, it is selected at a level lower than that for the third diode 34 but higher than that for the first diode 26. These relations hold true if the respective numbers of secondary windings and diodes are increased. Namely, it necessarily follows that the reverse withstanding voltage of the diode connected second from the output terminal on the high voltage side is the highest and that diodes connected nearer to the earth-side output terminal 24 may have lower reverse withstanding voltages.

Referring now to FIGS. 5, 7 and 8, there will be described the result of the theoretical analysis of the case where the reverse voltages are applied to the diodes.

When the switch 86 is closed, that is, when no discharge is caused in the picture tube, the high DC voltage delivered from the output terminal 40 is at the level $E_H$, and the voltages boosted by a smoothing circuit combining the secondary windings, diodes and the stray capacitors between the respective cathodes of the diodes and the earth are to be substantially equal, as mentioned with reference to FIGS. 2, 3 and 4. Under these circumstances, the DC cathode potential of the first diode 26 or the DC potential at the node 94 is at the level $E_H/4$, the DC cathode potential of the second diode 30 or the DC potential at the node 96 is at $2E_H/4$, and the DC cathode potential of the third diode 34 or the DC potential at the node 98 is at $3E_H/4$. Further, as shown in FIG. 7, the DC potential at the anode of the first diode 26 or the node 88 is at a level $V_D=0$, the DC potential at the anode of the second diode 30 or the node 90 is at $E_H/4$, the DC potential at the anode of the third diode 34 or the node 92 is at $2E_H/4$, and the DC potential at the anode of the fourth diode 38 or a node 93 is at $3E_H/4$. In FIG. 7, the diodes 26, 30, 34 and 38, secondary windings 22, 28, 32 and 36, cathode-side inter-layer capacitors 74, 78 and 82, and the stray capacitors 54, 62, 66 and 70 are omitted and replaced by voltage sources 112, 114, 116 and 118 for convenience. Also, the capacitor 72 is omitted, since it need not be taken into account in the process of the analysis of the case where the reverse voltages are applied to the diodes. It is so because the electric charges on the capacitor 72 will be discharged to reduce the voltage across it to zero immediately when the switch 86 is closed. If the voltage applied to the anode-side inter-layer capacitors 76, 80 and 84 are $V_A$, $V_B$ and $V_C$ respectively, then we obtain $$Q_A=C_A\cdot V_A, \quad (1)$$

$$Q_B=C_B\cdot V_B, \quad (2)$$

$$Q_C=C_C\cdot V_C, \quad (3)$$

$$Q_E=C_E\cdot V_A, \text{ and} \quad (4)$$

$$Q_F=C_F(V_A+V_B). \quad (5)$$

Here $C_A$, $C_B$ and $C_C$ are the respective capacitances of the anode-side inter-layer capacitors 76, 80 and 84, and $Q_A$, $Q_B$ and $Q_C$ are the values of electric charges on the anode-side inter-layer capacitors 76, 80 and 84 respectively. Further, $C_E$ and $C_F$ are the respective capacitances of the stray capacitors connected respectively between the anodes of the second and third diodes and the earth. Eqs. (1) to (5) include no equation regarding the stray capacitor 56 between the anode of the first diode 26 and the earth. It is so because the voltage across the stray capacitor 56 is always at the zero level and the stray capacitor 56 is not charged while the switch 86 is closed.

Subsequently, when the switch 86 is closed, that is, when discharge is caused within the picture tube, as shown in FIG. 8, the following equations come to hold. The voltage sources 112, 114 116 and 118 are not shown in FIG. 8, since the switch 86 is closed. It is to be noted that the following equations are given only immediately after the switch 86 is closed (t=0).

$$Q_G=C_A\cdot V_G, \quad (6)$$

$$Q_H=C_B\cdot V_H, \quad (7)$$

$$Q_I=C_C\cdot V_I, \quad (8)$$

$$Q_J=C_D\cdot V_J, \quad (9)$$

$$Q_K=C_E(V_J+V_G), \quad (10)$$

$$Q_L=C_F(V_J+V_G+V_H), \text{ and} \quad (11)$$

$$V_I=V_J+V_G+C_H. \quad (12)$$

Here $C_D$ is the capacitance of the stray capacitor 56 between the first diode 26 and the earth, $Q_G$, $Q_H$, $Q_I$, $Q_J$, $Q_K$ and $Q_L$ are the values of electric charges on the capacitors 76, 80, 84, 56, 64 and 68 respectively, and $V_G$, $V_H$, $V_I$ and $V_J$ are voltages applied respectively to the capacitors 76, 80, 84 and 56 immediately on the closing of the switch 86.

The following equations are established according to the conservation of electric charges.

$$-Q_C+Q_B+Q_F=Q_I+Q_H+Q_L \quad (13)$$

$$-Q_B+Q_A+Q_E=-Q_H+Q_G+Q_K \quad (14)$$

$$-Q_A=-Q_G+Q_S \quad (15)$$

Rearranging equations (1) to (15), we obtain $$\begin{pmatrix} V_I \\ V_H \\ V_G \\ V_J \end{pmatrix} \begin{pmatrix} +1 & -1 & -1 & -1 \\ C_C & (C_B+C_F) & C_F & C_F \\ O & -C_B & (C_A+C_F) & C_E \\ O & O & -C_A & C_D \end{pmatrix} = \begin{pmatrix} O \\ -C_CV_C+C_BV_B+C_F(V_A+V_B) \\ -C_BV_B+(C_A+C_E)\,V_A \\ -C_AV_A \end{pmatrix} \quad (16)$$

Substituting the aforementioned assumption $V_A=V_B=V_C=V_1(=E_H/4)$ and an additional assumption $C_A=C_B=C_C=C_1$ into either side of eq. (12), we obtain $$\begin{pmatrix} V_I \\ V_H \\ V_G \\ V_J \end{pmatrix} \begin{pmatrix} +1 & -1 & -1 & -1 \\ C_1 & (C_1+C_F) & C_F & C_F \\ O & -C_1 & (C_1+C_F) & C_E \\ O & O & -C_1 & C_D \end{pmatrix} = \quad (17)$$

-continued $$\begin{pmatrix} O \\ 2C_FV_1 \\ C_EV_1 \\ -C_1V_1 \end{pmatrix}$$

Derived from eq. (13) are $$V_I = V_1 \cdot \frac{-C_1^3 + C_1^2(2C_F + C_E) + C_1(4C_DC_F + 2C_EC_F + C_DC_E) + 2C_DC_EC_F}{C_1^3 + C_1^2(3C_D + 2C_E + C_F) + C_1(2C_DC_E + 2C_DC_F + C_EC_F) + C_DC_EC_F} \quad (18)$$

$$V_G = V_1 \cdot \frac{C_1^3 + C_1^2(2C_E + C_F) + C_1(2C_DC_F + 2C_DC_E + C_EC_F) + C_DC_EC_F}{C_1^3 + C_1^2(3C_D + 2C_E + C_F) + C_1(2C_DC_E + 2C_DC_F + C_EC_F) + C_DC_EC_F} \quad (19)$$

$$V_J = V_1 \cdot \frac{-3C_1^3}{C_1^3 + C_1^2(3C_D + 2C_E + C_F) + C_1(2C_DC_E + 2C_DC_F + C_EC_F) + C_DC_EC_F} \quad (20)$$

Accordingly, the anode potential of the first diode 26 or potential E5 at the node 88 is $$E5=V_J=(E_H/4)\alpha,$$

the anode potential of the second diode 30 or potential E6 at the node 90 is $$E_6=V_J+V_G=(E_H/4),\beta,$$

and the anode potential of the third diode 34 or potential E7 at the node 92 is $$E7=V_I=(E_H4)\gamma.$$

Moreover, the moment the switch 86 is closed, the cathode potential of the first diode 26 or potential E1 at the node 94 is E1$=E_H/4$, the cathode potential of the second diode 30 or potential E2 at the node 96 is E2$=-2E_H/4$, the cathode potential of the third diode 4 or potential E3 at the node 98 is E3$=3E_H/4$, and the cathode potential of the fourth diode 38 or potential E4 at the output terminal 40 is E4$=0$.

Accordingly, the reverse voltages applied to the diodes 26, 30, 34 and 38 are given as follows. That is, the reverse voltage $V_\alpha$ to the first diode 26 is $$V_\alpha = \frac{E_H}{4} - \frac{E_H}{4}\alpha = \frac{1-\alpha}{4}E_H = \frac{E_H}{4} \cdot \frac{4C_1^3 + C_1^2(3C_D + 2C_E + C_F) + C_1(2C_DC_E + 2C_DC_F + C_EC_F) + C_DC_EC_F}{C_1^3 + C_1^2(3C_D + 2C_E + C_F) + C_1(2C_DC_E + 2C_DC_F + C_EC_F) + C_DC_EC_F} \quad (20)$$

the reverse voltage $V_\beta$ to the second diode 30 is $$V_\beta = \frac{2E_H}{4} - \frac{E_H}{4}\beta = \frac{2-\beta}{4}E_H = \frac{E_H}{4} \cdot \frac{4C_1^3 + C_1^2(6C_D + 2C_E + C_F) + C_1(2C_DC_E + 2C_DC_F + C_EC_F) + C_DC_EC_F}{C_1^3 + C_1^2(3C_D + 2C_E + C_F) + C_1(2C_DC_E + 2C_DC_F + C_EC_F) + C_DC_EC_F} \quad (21)$$

and the reverse voltage $V_\gamma$ to the third diode 4 is $$V_\gamma = \frac{3E_H}{4} - \frac{E_H}{4} = \frac{3-\gamma}{4}E_H = \frac{E_H}{4} \cdot \frac{4C_1^3 + C_1^2(9C_D + 5C_E + C_F) + C_1(5C_DC_E + 2C_DC_F + C_EC_F) + C_DC_EC_F}{C_1^3 + C_1^2(3C_D + 2C_E + C_F) + C_1(2C_DC_E + 2C_DC_F + C_EC_F) + C_DC_EC_F} \quad (22)$$

$V_\alpha$, $V_\beta$ and $V_\gamma$ are all above zero, so that reverse voltages are applied to the first, second and third diodes 26, 30 and 34. Having $V_\alpha < V_\beta < V_\gamma$, we see that the reverse voltage applied to the first diode 26 is the lowest, and that the reverse voltage applied to the third diode 34 is the highest. According to still another embodiment of this invention, therefore, the reverse withstanding voltages of the first, second and third diodes 26, 30 and 34 are preferably set above $V_\alpha$, $V_\beta$ and $V_\gamma$, respectively, whereby the diode breakdown will be prevented.

FIG. 9 is a graph for illustrating the relationship between the reverse voltage $V_\alpha$, $V_\beta$ and $V_\gamma$ applied to the diodes as respectively given by eqs. (20), (21) and (22) and the capacitance C1 ($C1 = C_A$, $C_B$, $C_C$) of the anode-side inter-layer capacitors 76, 80 and 84. Curves $I_\alpha$, $I_\beta$ and $I_\gamma$ show relations between the reverse voltages $V_\alpha$, $V_\beta$ and $V_\gamma$ of the first, second and third diodes 26, 30 and 32 and the capacitance C1 of the inter-layer capacitors 76, 80 and 84, respectively, where the high DC output potential $E_H$ is 39 kV. Also, curves $II_\alpha$, $II_\beta$ and $II_\gamma$ show relations between the reverse voltages $V_\alpha$, $V_\beta$ and $V_\gamma$ and the capacitance C1, respectively, where the high DC output potential $E_H$ is 36.5 kV, while curves $III_\alpha$, $III_\beta$ and $III_\gamma$ like relations where the high DC output potential $E_H$ is 34 kV.

It is apparent from FIG. 9 that the smaller the capacitance C1 of the inter-layer capacitors 76, 80 and 84, the lower the reverse voltages $V_\alpha$, $V_\beta$ and $V_\gamma$ will be.

In the multilayer-winding fly-back transformer of this invention, there is provided a means for reducing the anode-side inter-layer capacitors 76, 80 and 84, in consideration of the result of the graph as shown in FIG. 9. According to a further embodiment of the multilayer-winding fly-back tranformer of the invention, as shown in FIG. 10, each two adjacent secondary windings have different winding lengths, with irregular winding ends. That is, whereas the lengths of the first and third secondary windings 22 and 32 are L1 each, those of the second and fourth secondary windings 28 and 36 are L2 (L2>L1) each. By varying the lengths of the adjacent secondary windings, the distance between, for example, an extra portion 28A of the second secondary winding 28 for a length (L2−L1) and the first secondary winding 16 adjacent thereto is larger as compared with the other corresponding portions. In consequence, the capacitance $C_A$ of the anode-side inter-layer capacitor 76 becomes smaller. Likewise, the capacitances $C_B$ and $C_C$ of the other inter-layer capacitors 80 and 84 become smaller. Thus, the possibility of breakdown of the diodes 34, 30 and 26, especially the diode 34, may satisfactorily be reduced.

What is claimed is:

1. A fly-back transformer comprising a number of cylindrical bobbins made of dielectric material and arranged concentrically, a magnetic core inserted in the innermost one of said bobbins, a primary winding wound in layer on the outer periphery of said innermost bobbin, a pair of input terminals connected to said primary winding, a number of secondary windings wound in layer in the same winding direction on the corresponding bobbins to be arranged between the remaining bobbins, a pair of output terminals connected respectively to the innermost and outermost ones of said secondary windings, a number of diodes each having a cathode and an anode and arranged over said outermost bobbin, one of said diodes being connected between said outermost secondary winding and one of said output terminals, the other of said diodes each of which is connected between each of said adjacent secondary windings in the forward direction thereby connecting said number of secondary windings in series between said pair of output terminals, and a capacitor formed between the cathode of said one diode connected to one end of said outermost secondary winding and the cathode of one of said other diodes whose anode is connected to the other end of said outermost secondary winding.

2. A fly-back transformer according to claim 1, wherein said capacitor is a capacitor element.

3. A fly-back transformer according to claim 1 further comprising lead wires connecting said diodes with their corresponding secondary windings, wherein said capacitor is formed of a pair of conductive metal plates fixed on said outermost bobbin and connected, respectively, to one lead wire connected to the cathode of one of said other diodes connected to one end of said outermost secondary winding and another lead wire connected to the cathode of said one diode whose anode is connected to the other end of said outermost secondary winding.

4. A fly-back transformer according to claim 1, wherein said capacitor has a capacitance substantially equal to that of each inter-layer capacitor formed between each two adjacent secondary windings.

5. A fly-back transformer comprising a number of cylindrical bobbins made of dielectric material and arranged concentrically, a magnetic core inserted in the innermost one of said bobbins, a primary winding wound in layer on the outer periphery of said innermost bobbin, a pair of input terminals connected to said primary winding, a number of secondary windings wound in layer in the same winding direction on the corresponding bobbins to be arranged between the remaining bobbins, a pair of output terminals connected respectively to the innermost and outermost ones of said secondary windings, and a number of diodes each having a cathode and an anode and arranged over said outermost bobbin, one of said diodes being connected between said outermost secondary winding and one of said output terminals, the other of said diodes each of which is connected between each of said adjacent secondary windings in the forward direction thereby connecting said number of secondary windings in series between said pair of output terminals, one of said other diodes which is connected between said outermost secondary winding and a secondary winding adjacent to and inside said outermost secondary winding having a higher reverse withstanding voltage as compared with the others.

6. A fly-back transformer according to claim 5, wherein one of said other diodes connected to inner ones of said secondary windings have lower reverse withstand voltages, excepting said one diode connected between said outermost secondary winding and one of said output terminals.

7. A fly-back transformer according to claim 5, wherein said bobbins include first, second, third, fourth, fifth and the outermost bobbins, said secondary windings include first, second, third and fourth windings, said diodes include first, second, third and fourth diodes, said primary winding is wound on the outer periphery of said first bobbin located in the innermost position, said first secondary winding having one end connected to one of said output terminal and the other end connected to the anode of said first diode is wound on the outer periphery of said second bobbin outside said first bobbin, said second secondary winding having one end connected to the cathode of said first diode and the other end connected to the anode of said second diode is wound on the outer periphery of said third bobbin outside said second bobbin, said third secondary winding having one end connected to the cathode of said second diode and the other end connected to the anode of said third diode is wound on the outer periphery of said fourth bobbin outside said third bobbin, said fourth secondary winding having one end connected to the cathode of said third diode and the other end connected to the anode of said fourth diode is wound on the outer periphery of said fifth bobbin outside said fourth bobbin, said outermost bobbin is located outside said fifth bobbin, said first, second, third and fourth diodes are arranged over said outermost bobbin, and the cathode of said fourth diode is connected to the other of said output terminals.

8. A fly-back transformer according to claim 5, wherein said first, second and third diodes have reverse withstanding voltages above $V_\alpha$, $V_\beta$ and $V_\gamma$ respectively, said voltages $V_\alpha$, $V_\beta$ and $V_\gamma$ being given as follows:

$$V_\alpha = \frac{E_H}{4} \cdot \frac{4C_1^3 + C_1^2(3C_D + 2C_E + C_F) + C_1(2C_DC_E + 2C_DC_F + C_EC_F) + C_DC_EC_F}{C_1^3 + C_1^2(3C_D + 2C_E + C_F) + C_1(2C_DC_E + 2C_DC_F + C_EC_F) + C_DC_EC_F}$$

$$V_\beta = \frac{E_H}{4} \cdot \frac{4C_1^3 + C_1^2(6C_D + 2C_E + C_F) + C_1(2C_DC_E + 2C_DC_F + C_EC_F) + C_DC_EC_F}{C_1^3 + C_1^2(3C_D + 2C_E + C_F) + C_1(2C_DC_E + 2C_DC_F + C_EC_F) + C_DC_EC_F}$$

$$V_r = \frac{E_H}{4} \cdot \frac{4C_1^3 + C_1^2(9C_D + 5C_E + C_F) + C_1(5C_DC_E + 2C_DC_F + C_EC_F) + C_DC_EC_F}{C_1^3 + C_1^2(3C_D + 2C_E + C_F) + C_1(2C_DC_E + 2C_DC_F + C_EC_F) + C_DC_EC_F}$$

where C1 is the capacitance of an inter-layer capacitor as measured from the other ends of each two adjacent secondary windings connected to the anode side of said diodes, $C_D$, $C_E$ and $C_F$ are the respective capacitances of stray capacitors formed respectively between the anodes of said first, second and third diodes and the earth, and $E_H$ is a voltage delivered from said output terminal.

9. A fly-back transformer comprising a number of cylindrical bobbins made of dielectric material and arranged concentrically, a magnetic core inserted in the innermost one of said bobbins, a primary winding wound in layer on the outer periphery of said innermost bobbin, a pair of input terminals connected to said primary winding, a number of secondary windings wound in layer in the same winding direction on the corresponding bobbins to be arranged between the remaining bobbins, a pair of output terminals connected respectively to the innermost and outermost ones of said secondary windings, and a number of diodes each having a cathode and an anode and arranged over said outermost bobbin, one of said diodes being connected between said outermost secondary winding and one of said output terminals, the other of said diodes each of which is connected between each of said adjacent secondary windings in the forward direction thereby connecting said number of secondary windings in series between said pair of output terminals; wherein inter-layer capacitors are formed between adjacent ones of said secondary windings, said inter-layer capacitors consisting of anode-side inter-layer capacitors to be measured from between one ends of said adjacent secondary windings connected to the anodes of said diodes and cathode-side inter-layer capacitors to be measured from between the other ends of said adjacent secondary windings connected to the cathodes of said diodes or one of said output terminals to be earthed, the capacitance of each said anode-side inter-layer capacitor being lower than that of each said cathode-side inter-layer capacitor.

10. A fly-back transformer according to claim 9, wherein the winding lengths of each two adjacent secondary windings are different.

* * * * *